H. D'OLIER, Jr.
GAUGE FOR ELECTRIC LAMPS AND ACCESSORIES.
APPLICATION FILED MAY 24, 1920.
1,427,586.
Patented Aug. 29, 1922.
2 SHEETS—SHEET 1.
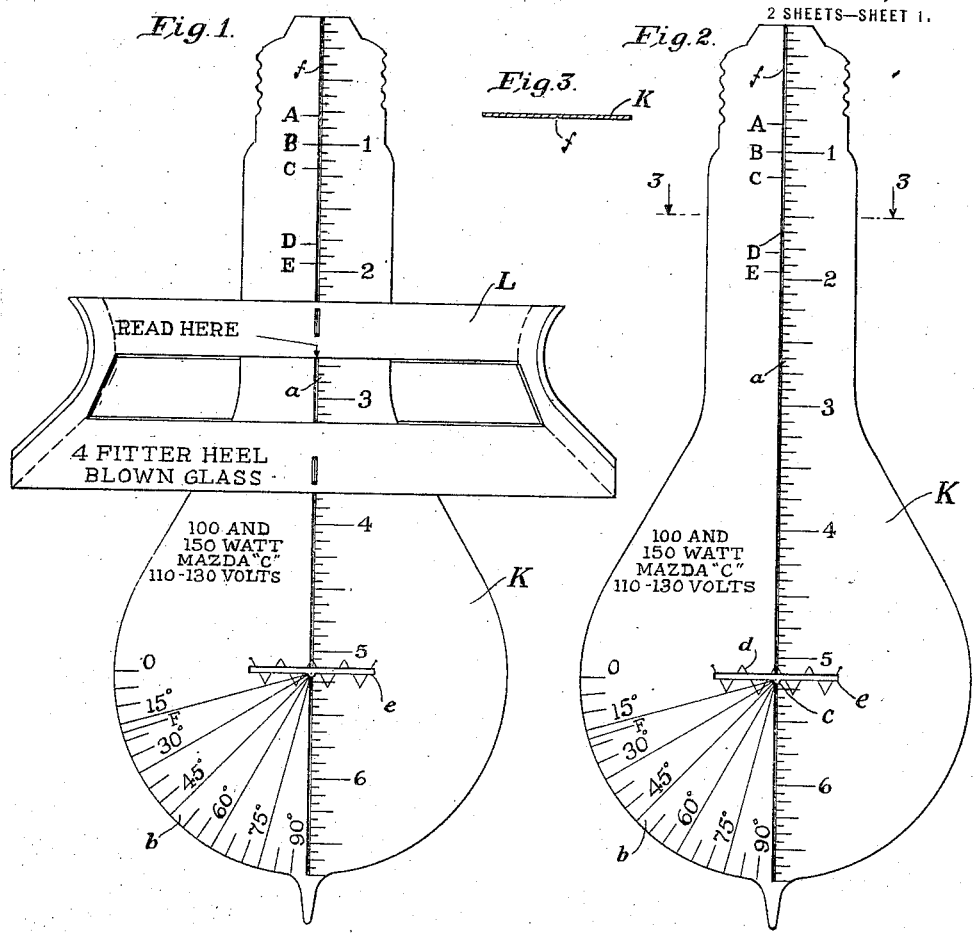
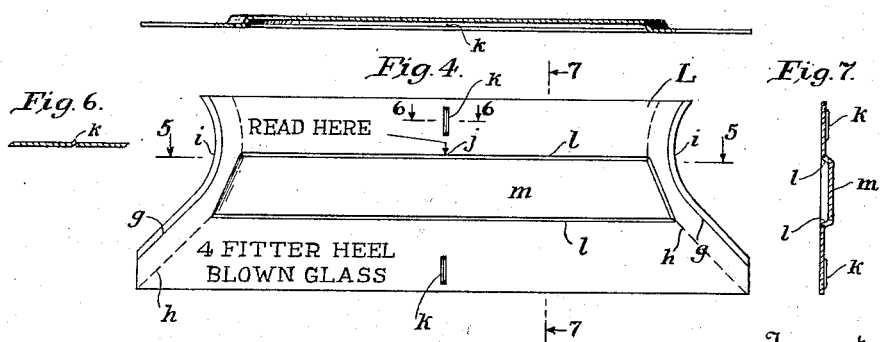
Inventor
Henry D'Olier Jr.
By S. Jay Teller
Attorney.

H. D'OLIER, Jr.
GAUGE FOR ELECTRIC LAMPS AND ACCESSORIES.
APPLICATION FILED MAY 24, 1920.
1,427,586.
Patented Aug. 29, 1922.
2 SHEETS—SHEET 2.
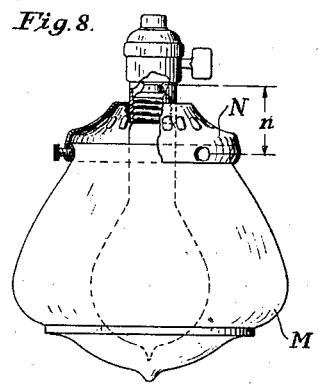
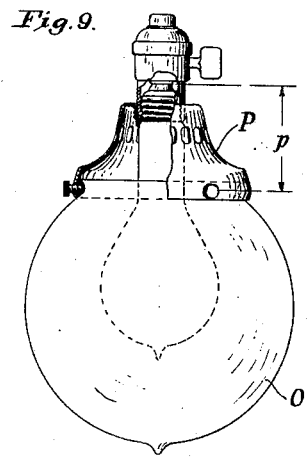
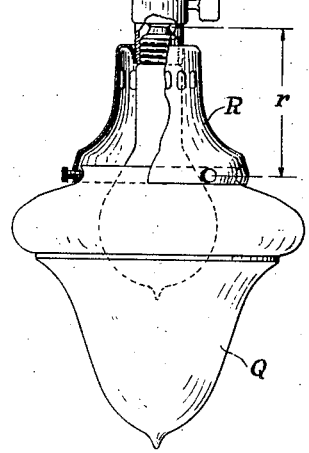
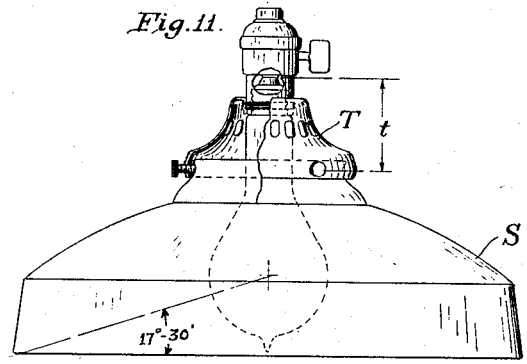
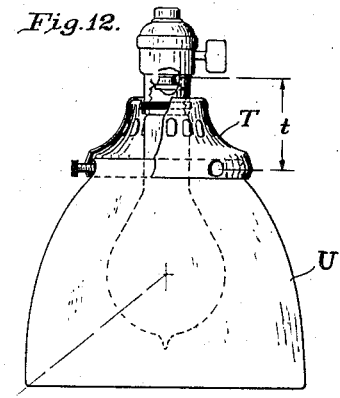
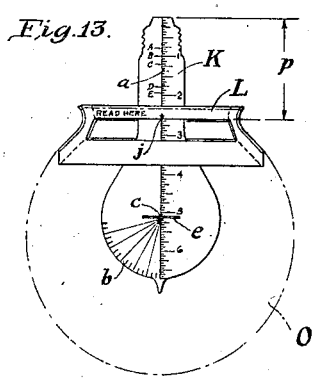
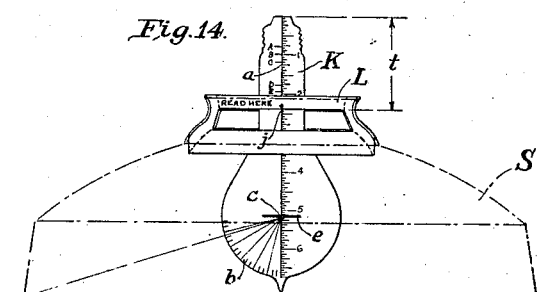
Inventor
Henry D'Olier Jr.
By S. Jay Teller
Attorney.

UNITED STATES PATENT OFFICE.

HENRY D'OLIER, JR., OF BRIDGEPORT, CONNECTICUT.

GAUGE FOR ELECTRIC LAMPS AND ACCESSORIES.

1,427,586.  Specification of Letters Patent.  Patented Aug. 29, 1922.

Application filed May 24, 1920. Serial No. 383,868.

*To all whom it may concern:*

Be it known that I, HENRY D'OLIER, Jr., a citizen of the United States, residing at Bridgeport, in the county of Fairfield and State of Connecticut, have invented certain new and useful Improvements in Gauges for Electric Lamps and Accessories, of which the following is a specification.

This invention relates to a gauge adapted to be used in connection with the design, selection or assembly of electric lamps and the fittings or fixtures therefor such as the sockets, the reflectors or glassware units and the holders for the reflectors or glassware units. One object of the invention is to provide a gauge which will make it possible for electric lamps and the fixtures or accessories therefor to be readily designed or selected in relation to each other so as to provide a lighting assembly which will give the proper lighting effect and the proper light distribution. Another object of the invention is to provide a lamp templet gauge approximately conforming in contour to the longitudinal sectional contour of a specified electric lamp and having certain markings thereon that are useful in the selection of accessories or fixtures to be used in the lamp specified. Another object of the invention is to provide a templet gauge approximately conforming in contour to the longitudinal sectional contour of the heel portion of a specified reflector or glassware unit and having markings thereon which are useful in checking up the size of the reflector or glassware unit and which are also useful in the selection of the proper lamp or holder to be used with a specified reflector or glassware unit. Other objects of the invention will be apparent from the following specification and claims.

In the accompanying drawings I have illustrated the embodiment of the invention which I now deem preferable, but it will be understood that certain changes may be made from the construction shown without departing from the spirit of the invention as set forth in the claims appended to this specification.

Of the drawings:

Figure 1 is a plan view of a complete gauge embodying the invention.

Fig. 2 is a plan view of the lamp templet part of the gauge.

Fig. 3 is a sectional view taken along the line 3—3 of Fig. 2.

Fig. 4 is a plan view of the heel templet part of the gauge.

Fig. 5 is a sectional view taken along the line 5—5 of Fig. 4.

Fig. 6 is a fragmentary sectional view taken along the line 6—6 of Fig. 4.

Fig. 7 is a sectional view taken along the line 7—7 of Fig. 4.

Figs. 8, 9 and 10 are views partly in section showing different lighting assemblies, the views illustrating the necessity for different holders in order to properly locate the lamps in glassware units of different shapes.

Figs. 11 and 12 are views partly in section showing the relations between reflectors or glassware units and the holders therefor that are necessary in order to locate the lamps so as to provide certain desired angles of light cut-off.

Fig. 13 illustrates the gauge shown in Fig. 1 in use in conjunction with a diagram of the glassware unit shown in Fig. 9.

Fig. 14 illustrates the gauge shown in Fig. 1 in use in conjunction with a diagram of the reflector shown in Fig. 11.

Referring to the drawings, particularly Fig. 1, it will be seen that the complete gauge comprises two main parts designated K and L respectively. The part K comprises a thin plate or sheet of metal or other suitable material in the form of a templet and it approximately conforms in contour and preferably in size to the longitudinal sectional contour of a specified incandescent electric lamp. The part L also comprises a thin plate or sheet of metal or other suitable material in the form of a templet and it approximately conforms in contour and preferably in size to the longitudinal sectional contour of the upper or heel portion of a specified reflector or glassware unit adapted to be used in conjunction with the lamp represented by the lamp templet K. These two gauge parts are adapted to be used in conjunction with each other in the way to be presently described, but it is to be understood that each of the parts is capable of use for certain purposes independently of the other.

Referring more in detail to the lamp templet gauge K, as shown in Figs. 2 and 3, it is to be understood that any given gauge is properly marked to indicate the trade name or designation of the lamp which it represents. In the drawing, for instance, the templet is marked as follows: "100 and 150 watt Mazda C 110–130 volts."

The templet K is provided with a centrally disposed longitudinal scale $a$ extending downward from the top of the lamp and preferably graduated to read in inches, as shown in the drawing. This scale is useful either in conjunction with the gauge part L or independently thereof for indicating the position of the reflector or glassware unit with respect to the top of the lamp or the base of the lamp socket. By means of this scale it is possible to determine the size or length of the holder that is necessary for holding a given reflector or glassware unit in proper relation to the lamp. Inasmuch as the holders are ordinarily made in certain standard lengths, I preferably provide the lamp templet with special markings along the scale corresponding respectively to the lengths of standard holders. These markings are shown at A, B, C, D and E, each marking corresponding to the length of a standard holder. The templet K also has a protractor $b$ marked thereon, this protractor consisting of lines extending outward from a central point corresponding in position to the light center of the lamp. The protractor has numbers thereon adjacent the lines indicating angles so that the protractor can be used in conjunction with a diagram of a proposed reflector or glassware unit to show the angle of light cut-off. A certain angle of light cut-off is recognized by illuminating engineers as desirable, this angle ordinarily being seventeen and one half degrees. The protractor is preferably provided therefore with a special marking F thereon indicating this standard or prescribed angle of light cut-off.

Preferably at the light center or focus of the lamp there is provided an opening or notch $c$ through which a mark representing the light center can be made on an underlying drawing or diagram. The lamp templet K is preferably provided with a marking $d$ thereon which indicates the position of the filament of the specified lamp. In addition to the hole or notch $c$ the gauge is provided with a larger hole or slot $e$ which represents in a general way the outline of the filament. This larger opening $e$ can also be used for making a mark on an underlying drawing or diagram to indicate the position of the filament.

In order that the lamp templet K may be more readily used in conjunction with another gauge element, such as the heel templet L, it is provided with a suitable guide extending longitudinally. As illustrated, this guide is in the form of a groove $f$ extending longitudinally of the templet immediately adjacent the scale $a$.

Referring now more particularly to the templet L as shown in Figs. 4 to 7, it is to be understood that any given gauge is properly marked to indicate the trade name or designation of the heel portion of the reflector or glassware unit which it represents. In the drawing, for instance, the templet is marked as follows: "4 fitter heel blown glass".

The external contour of the templet L represents the maximum allowable outside size of the heel portion of the reflector or glassware unit to be used. Marked on the templet are lines $g$ representing the minimum allowable outside size. Also marked on the templet are other lines $h$ representing the minimum allowable inside size. It will be seen that by providing a full sized drawing or diagram of the proposed reflector or glassware unit the size thereof can be readily checked by means of the gauge.

The reflector or glassware unit represented by the templet L is engaged by the screws of the holder at points such as $i, i$. The templet is provided with a centrally disposed marking $j$ which is in line with the points $i, i$ and which can be used in conjunction with the scale on the templet K or in conjunction with an independent scale to determine the length of the holder necessary for the specified reflector or glassware unit. Preferably the templet L is so constructed that it is adapted to be readily used in conjunction with the templet K and to this end it is provided with a guide or guides adapted to engage the guide-way of the templet K. As before described, the templet K is provided with a guide-way in the form of a groove $f$ and when this is the case the templet L is provided with points $k$ pressed outward from the metal and adapted to enter the groove $f$. In order that the templet L may more readily be held in assembled relation with the templet K it is slotted preferably at two places $l$—$l$ and the strip $m$ between the slots is depressed so as to make it possible for the templet K to be inserted between the said strip $m$ and the main body part of the templet L. Preferably one slot is so located that the reading point $j$ is at one edge thereof. By preference, also, the slots terminate at the lines $h$, so that they may be used in checking the internal sizes of reflectors or glassware units. When the templet L is constructed as above described the two templets can be readily assembled as fully illustrated in Fig. 1. The points $k$ on the templet L enter the groove $f$ in the templet K and thus guide the templets for relative movement upward or downward in a straight line. The depressed strip m of the templet L is so positioned that it causes frictional engagement between the two templets and they are thus automatically held in any relative position to which they may be moved.

Figs. 8, 9 and 10 show lighting assemblies comprising differently shaped glassware units and holders therefor. As shown in Fig. 8, the glassware unit M is adapted for a relatively low position of the lamp and therefore requires a relatively short holder N having a length n. As shown in Fig. 9, the glassware unit O is adapted for the intermediate position of the lamp and therefore requires a holder P of intermediate length p. As shown in Fig. 10, the glassware unit Q is adapted for a relatively high position of the lamp and therefore requires a relatively long holder R having a length r.

Figs. 11 and 12 show lighting assemblies comprising differently shaped reflectors and holders therefor. As shown in Fig. 11, the lamp is so positioned with respect to the reflector S as to give an angle of light cut-off of approximately seventeen and one half degrees which is in accordance with the usual standard. To hold the parts in this position requires a certain holder T having a length t. Fig. 12 is similar to Fig. 11 but shows a reflector U substituted for the reflector S without, however, making any change in the holder T. It will be seen that the angle of light cut-off is much greater and is in fact much too great for ordinary purposes.

Fig. 13 shows the complete gauge in use in conjunction with a drawing or diagram representing the glassware unit O. It will be understood that the templet L may be used, as before stated, for checking up the outside and inside sizes of the heel portion of the unit. For this purpose the templet is simply laid on the drawing or diagram representing the glassware unit and comparison of sizes is made. The templet K may be used either in conjunction with the templet L or independently thereof for representing the position of the lamp in relation to the glassware unit. It can be moved upward or downward as necessary to position the light center in proper relation. Then the scale a can be used to indicate the distance p from the top of the lamp to the line or plane at which the screws of the holder engage the glassware unit. The two templets K and L can most conveniently be used in conjunction with each other, as illustrated. In this case the point j on the templet L is in line with the points of engagement of the screws and therefore by noting the position of this point with relation to the scale a it is possible to read directly the length p of the required holder. It will be seen that by means of the hole or notch c and the slot e the position of the light center and of the filament can be marked on the drawing or diagram if desired.

Fig. 14 is similar to Fig. 13 but shows the reflector S instead of the glassware unit O. It will be seen that the templet K representing the lamp can be moved upward or downward to provide the desired angle of cut-off, which angle can be read from the protractor b. The templet K having been positioned to give the proper angle it is then possible to read the scale a to determine the length t of required holder. It will be obvious that if the holder has already been selected it is possible to determine the angle of cut-off that will be obtained by first setting the templet K so that the scale reading corresponds to the length t of the holder and then noting the angle as measured by the protractor b.

What I claim is:

1. A lamp templet gauge comprising a thin plate approximately conforming in contour to the longitudinal sectional contour of a specified incandescent electric lamp and having marked thereon a centrally disposed longitudinal scale extending downward from the top of the lamp contour, said scale having means thereon to indicate the position of a light center.

2. A lamp templet gauge comprising a thin plate approximately conforming in contour to the longitudinal sectional contour of a specified incandescent electric lamp and having marked thereon a centrally disposed longitudinal scale extending downward from the top of the lamp contour and also having marked thereon along the scale special distances corresponding respectively to certain standard shade and reflector holders.

3. A lamp templet gauge comprising a thin plate approximately conforming in contour to the longitudinal sectional contour of a specified incandescent electric lamp and having marked thereon a protractor consisting of lines extending outward from a central point corresponding to the light center of the lamp and numbers adjacent the lines indicating angles of light cut-off.

4. A lamp templet gauge comprising a thin plate approximately conforming in contour to the longitudinal sectional contour of a specified incandescent electric lamp and having marked thereon a protractor consisting of lines extending outward from a central point corresponding to the light center of the lamp and numbers adjacent the lines indicating angles of light cut-off, the said gauge also having marked thereon along the protractor a special angle indicating a standard or prescribed angle of light cut-off.

5. A lamp templet gauge comprising a thin plate approximately conforming in contour to the longitudinal sectional contour of a specified incandescent electric lamp and having an opening therein at the light center, so that a mark can be made through the opening on an underlying drawing or diagram to indicate the position of the said light center.

6. A lamp templet gauge comprising a thin plate approximately conforming in contour to the longitudinal sectional contour of a specified incandescent electric lamp and having an opening therein approximately conforming to the outline of the lamp filament, so that a mark can be made along the outline of the opening on an underlying drawing or diagram to indicate the position of the said filament.

7. A lamp templet gauge comprising a thin plate approximately conforming in contour to the longitudinal sectional contour of a specified incandescent electric lamp and having marked thereon a centrally disposed longitudinal scale extending downward from the top of the lamp contour and also having marked thereon a protractor consisting of lines extending outward from a central point corresponding to the light center of the lamp and numbers adjacent the lines indicating angles of light cut-off.

8. A lamp templet gauge comprising a thin plate approximately conforming in contour to the longitudinal sectional contour of a specified incandescent electric lamp and having marked thereon a centrally disposed longitudinal scale extending downward from the top of the lamp contour and also having marked thereon a protractor consisting of lines extending outward from a central point corresponding to the light focus of the lamp and numbers adjacent the lines indicating angles of light cut-off, the said gauge in addition having marked thereon along the scale special distances corresponding respectively to certain standard shade and reflector holders and having marked thereon along the protractor a special angle indicating a standard or prescribed angle of light cut-off.

9. A lamp templet gauge comprising a thin plate approximately conforming in contour to the longitudinal sectional contour of a specified incandescent electric lamp and having marked thereon a centrally disposed longitudinal scale extending downward from the top of the lamp contour and also having an opening therein at the light center, so that a mark can be made through the opening on an underlying drawing or diagram to indicate the position of the said light center.

10. A lamp templet gauge comprising a thin plate approximately conforming in contour to the longitudinal sectional contour of a specified incandescent electric lamp and having marked thereon a protractor consisting of lines extending outward from a central point corresponding to the light center of the lamp and numbers adjacent the lines indicating angles of light cut-off and also having an opening therein at the light center, so that a mark can be made through the opening on an underlying drawing or diagram to indicate the position of the said light center.

11. A lamp templet gauge comprising a thin plate approximately conforming in contour to the longitudinal sectional contour of a specified incandescent electric lamp and having marked thereon a centrally disposed longitudinal scale extending downward from the top of the lamp contour and also having marked thereon a protractor consisting of lines extending outward from a central point corresponding to the light center of the lamp and numbers adjacent the lines indicating angles of light cut-off, the said gauge also having an opening therein at the light center, so that a mark can be made through the opening on an underlying drawing or diagram to indicate the position of the said light center.

12. A lamp templet gauge comprising a thin plate approximately conforming in contour to the longitudinal sectional contour of a specified incandescent electric lamp and having a longitudinal guide thereon for engagement with a longitudinally adjustable templet gauge for the heel of a specified reflector or glassware unit.

13. A lamp templet gauge comprising a thin plate approximately conforming in contour to the longitudinal sectional contour of a specified incandescent electric lamp and having a longitudinal groove therein adapted to serve as a guide thereon for engagement with a longitudinally adjustable templet gauge for the heel of a specified reflector or glassware unit.

14. A lamp templet gauge comprising a thin plate approximately conforming in contour to the longitudinal sectional contour of a specified incandescent electric lamp and having a longitudinal guide thereon for engagement with a longitudinally adjustable templet gauge for the heel of a specified reflector or glassware unit, the said gauge also having marked thereon a centrally disposed longitudinal scale extending downward from the top of the lamp contour and also having marked thereon lines extending outward from a central point corresponding to the light focus of the lamp and numbers adjacent the lines indicating angles of light cut-off.

15. A templet gauge comprising a thin plate approximately corresponding in contour of the longitudinal sectional contour of the heel portion of a specified reflector or glassware unit for an electric lamp and having a centrally disposed reading point thereon located in line with the points at which the said heel portion of the reflector or glassware unit would be engaged by the screws of a holder.

16. A templet gauge comprising a thin plate approximately corresponding in contour to the longitudinal sectional contour of the heel portion of a specified reflector or glassware unit for an electric lamp and having lines thereon representing allowable maximum and minimum diameters of the reflector or glassware unit, the said gauge also having a centrally disposed reading point thereon located in line with the points at which the said heel portion of the reflector or glassware unit would be engaged by the screws of a holder.

17. A templet gauge comprising a thin plate approximately corresponding in contour to the longitudinal sectional contour of the heel portion of a specified reflector or glassware unit for an electric lamp and having a centrally disposed reading point thereon located in line with the points at which the said heel portion of the shade or reflector would be engaged by the screws of a holder, the said gauge also having a guide formed thereon for engagement with the guide of a lamp templet gauge.

18. A templet gauge comprising a thin plate approximately corresponding in contour to the longitudinal sectional contour of the heel portion of a specified reflector or glassware unit for an electric lamp and having a centrally disposed reading point thereon located in line with the points at which the said heel portion of the shade or reflector would be engaged by the screws of a holder, the said gauge also having two spaced pointed guides formed thereon for engagement with the walls of a longitudinal guide groove in a lamp templet gauge.

19. A templet gauge comprising a thin plate approximately corresponding in contour to the longitudinal sectional contour of the heel portion of a specified reflector or glassware unit for an electric lamp and having a centrally disposed reading point thereon located in line with the points at which the said heel portion of the shade or reflector would be engaged by the screws of a holder, the said gauge also being formed with a transverse slot adapted to receive a lamp templet gauge.

20. A templet gauge comprising a thin plate approximately corresponding in contour to the longitudinal sectional contour of the heel portion of a specified reflector or glassware unit for an electric lamp and having a centrally disposed reading point thereon located in line with the points at which the said heel portion of the shade or reflector would be engaged by the screws of a holder, the said gauge also being formed with two transverse slots adapted to receive a lamp templet gauge, the strip between the slots being depressed.

21. A templet gauge comprising a thin plate approximately corresponding in contour to the longitudinal sectional contour of the heel portion of a specified reflector or glassware unit for an electric lamp and having a centrally disposed reading point thereon located in line with the points at which the said heel portion of the shade or reflector would be engaged by the screws of a holder, the said gauge also having a guide formed thereon for engagement with the guide of a lamp templet gauge and also being formed with two transverse slots adapted to receive a lamp templet gauge, the strip between the slots being depressed.

22. The combination in a gauge of a templet comprising a thin plate approximately conforming in contour to the longitudinal sectional contour of a specified incandescent electric lamp, a thin plate approximately corresponding in contour to the longitudinal sectional contour of the heel portion of a specified reflector or glassware unit for an electric lamp, and means for frictionally holding the templets in relatively adjusted position.

23. The combination in a gauge of a templet comprising a thin plate approximately conforming in contour to the longitudinal sectional contour of a specified incandescent electric lamp, and a templet comprising a thin plate approximately corresponding in contour to the longitudinal sectional contour of the heel portion of a specified reflector or glassware unit for an electric lamp, the said templets being relatively adjustable longitudinally.

24. The combination in a gauge of a templet comprising a thin plate approximately conforming in contour to the longitudinal sectional contour of a specified incandescent electric lamp, a templet comprising a thin plate approximately corresponding in contour to the longitudinal sectional contour of the heel portion of a specified reflector or glassware unit for an electric lamp, the said templets being relatively adjustable longitudinally and means for frictionally holding the templets in relatively adjusted position.

25. The combination in a gauge of a templet comprising a thin plate approximately conforming in contour to the longitudinal sectional contour of a specified incandescent electric lamp, and a templet comprising a thin plate approximately corresponding in contour to the longitudinal sectional contour of the heel portion of a specified reflector or glassware unit for an electric lamp, the said templets being provided respectively with guides in engagement with each other whereby the templets are guided for relative longitudinal movement in a straight line.

26. The combination in a gauge of a templet comprising a thin plate approximately conforming in contour to the longitudinal sectional contour of a specified incandescent electric lamp, and a templet comprising a thin plate approximately corresponding in contour to the longitudinal sectional contour of the heel portion of a specified reflector or glassware unit for an electric lamp, the said templets being provided respectively with guides in engagement with each other whereby the templets are guided for relative longitudinal movement in a straight line and the last said templet being formed with two transverse slots adapted to receive the first said templet and having the strip between the slots depressed and frictionally engaging the back of the first templet.

27. The combination in a gauge of a templet comprising a thin plate approximately conforming in contour to the longitudinal sectional contour of a specified incandescent electric lamp and having marked thereon a centrally disposed longitudinal scale extending downward from the top of the lamp contour, and a templet comprising a thin plate approximately corresponding in contour to the longitudinal sectional contour of the heel portion of a specified reflector or glassware unit for an electric lamp and having a centrally disposed reading point thereon located in line with the points at which the said heel portion of the reflector or glassware unit would be engaged by the screws of a holder, the last said templet being longitudinally adjustable with respect to the first said templet and the said reading point of the last said templet being adjacent the scale of the first said templet.

28. The combination in a gauge of a templet comprising a thin plate approximately conforming in contour to the longitudinal sectional contour of a specified incandescent electric lamp and having marked thereon a protractor consisting of lines extending outward from a central point corresponding to the light center of the lamp and numbers adjacent the lines indicating angles of light cut-off, and a templet comprising a thin plate approximately corresponding in contour to the longitudinal sectional contour of the heel portion of a specified reflector or glassware unit for an electric lamp, the last said templet being longitudinally adjustable with respect to the first said templet and the said reading point of the last said templet being adjacent the scale of the first said templet.

29. The combination in a gauge of a templet comprising a thin plate approximately conforming in contour to the longitudinal sectional contour of a specified incandescent electric lamp and having an opening therein at the light center, so that a mark can be made through the opening on an underlying drawing or diagram to indicate the position of the said light center, and a templet comprising a thin plate approximately corresponding in contour to the longitudinal sectional contour of the heel portion of a specified reflector or glassware unit for an electric lamp, the last said templet being longitudinally adjustable with respect to the first said templet and the said reading point of the last said templet being adjacent the scale of the first said templet.

30. The combination in a gauge of a templet comprising a thin plate approximately conforming in contour to the longitudinal sectional contour of a specified incandescent electric lamp and having marked thereon a centrally disposed longitudinal scale extending downward from the top of the lamp contour and also having marked thereon a protractor consisting of lines extending outward from a central point corresponding to the light center of the lamp and numbers adjacent the lines indicating angles of light cut-off, and a templet comprising a thin plate approximately corresponding in contour to the longitudinal sectional contour of the heel portion of a specified reflector or glassware unit for an electric lamp and having a centrally disposed reading point thereon located in line with the points at which the said heel portion of the reflector or glassware unit would be engaged by the screws of a holder, the last said templet being longitudinally adjustable with respect to the first said templet and the said reading point of the last said templet being adjacent the scale of the first said templet.

31. The combination in a gauge of a templet comprising a thin plate approximately conforming in contour to the longitudinal sectional contour of a specified incandescent electric lamp and having marked thereon a centrally disposed longitudinal scale extending downward from the top of the lamp contour and also having an opening therein at the light center, so that a mark can be made through the opening on an underlying drawing or diagram to indicate the position of the said light center, and a templet comprising a thin plate approximately corresponding in contour to the longitudinal sectional contour of the heel portion of a specified reflector or glassware unit for an electric lamp and having a centrally disposed reading point thereon located in line with the points at which the said heel portion of the reflector or glassware unit would be engaged by the screws of a holder, the last said templet being longitudinally adjustable with respect to the first said templet and the said reading point of the last said templet being adjacent the scale of the first said templet.

32. The combination in a gauge of a templet comprising a thin plate approximately conforming in contour to the longitudinal sectional contour of a specified incandescent electric lamp and having marked thereon a protractor consisting of lines extending outward from a central point corresponding to the light center of the lamp and numbers adjacent the lines indicating angles of light cut-off and also having an opening therein at the light center, so that a mark can be made through the opening on an underlying drawing or diagram to indicate the position of the said light center, and a templet comprising a thin plate approximately corresponding in contour to the longitudinal sectional contour of the heel portion of a specified reflector or glassware unit for an electric lamp and having a centrally disposed reading point thereon located in line with the points at which the said heel portion of the reflector or glassware unit would be engaged by the screws of a holder, the last said templet being longitudinally adjustable with respect to the first said templet and the said reading point of the last said templet being adjacent the scale of the first said templet.

In testimony whereof, I hereto affix my signature.

HENRY D'OLIER, Jr.